Dec. 18, 1956  D. CARNEGIE, JR  2,774,685
FLEXIBLE FELT BASE COVERING
Filed Sept. 18, 1953
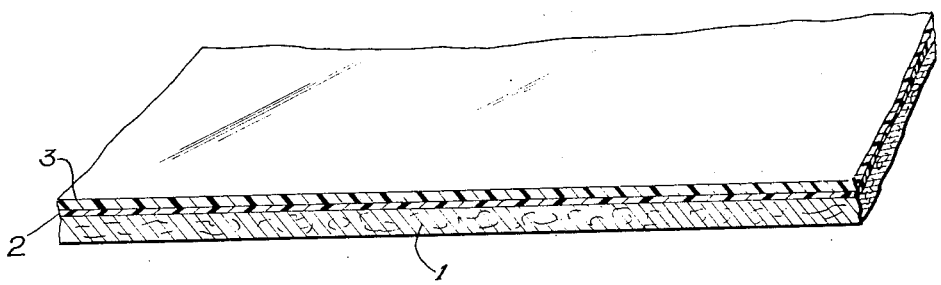
INVENTOR.
DAVID CARNEGIE, JR.
BY
Kenyon & Kenyon
ATTORNEYS

United States Patent Office 2,774,685
Patented Dec. 18, 1956

2,774,685
FLEXIBLE FELT BASE COVERING

David Carnegie, Jr., Wallpack Center, N. J., assignor to Congoleum-Nairn Inc., a corporation of New York Application September 18, 1953, Serial No. 380,893

3 Claims. (Cl. 117—76)

This invention relates to flexible felt base coverings of the hard-surface type for floors, walls, panels, articles of furniture and the like.

Flexible felt base coverings are well known to the art and, generally speaking, comprise a felt base sheet impregnated with a bituminous material, one or more seal coats, and one or more layers having desired properties as regards wear resistance and ornamentation. In such coverings one or more seal coats have been employed for the purpose of preventing the impregnating material for the felt, generally asphalt, from staining and discoloring the exposed surface of the covering. For many years felt base coverings have been manufactured wherein the layer or layers for providing the desired decorative and wear-resisting properties have utilized binder vehicles of the drying oil-resin type in combination with suitable pigments, fillers and the like; and for use in such felt base coverings seal coat formulations have been developed which meet the requirements for affording an effective seal and adequate adhesion both to the felt base sheet and to the overlying decorative and wear-resistant layer.

As compared with the use of compositions comprising a vehicle of the drying oil-resin or similar types, vinyl resins have known properties of increased resistance to abrasion and increased resistance to chemicals which render them of especial value and utility in providing the wear-resistant and decorative layer or coating for a felt base floor covering. However, utilization of vinyl resins for providing a decorative and wear-resistant surface layer for a felt base floor covering has given rise to special problems as regards the provision of suitable seal coat means, for without suitable seal coat means a surface layer or coating of the vinyl composition type is very susceptible to staining and discoloration due to migration of bitumen from the impregnated felt base sheet. Vinyl compositions have known properties of lack of adhesion to conventional paints, varnishes, lacquers and the like, and it is because of this lack of adhesion that an outer coating of vinyl resin composition cannot satisfactorily be applied to conventional seal coat compositions having an oleoresinous or nitrocellulose base. When attempts have been made to utilize other types of coating composition including compounded plasticized vinyl resins to provide a sealing coat for use with an outer coat or layer of vinyl composition, serious difficulties have been encountered caused by a failure to secure adequate sealing or adequate adhesion, or both. One of the methods which has been used to overcome the adhesion deficiency has consisted in applying an adhesive coat to the conventional seal coat so as to promote the adhesion of a succeeding coating or layer of vinyl composition. However, delamination difficulties and failures of the adhesive bond on aging or in service have been such that this method is not generally acceptable.

While there are many plasticizers which may be formulated with vinyl resins, I have found that effective barrier protection for preventing staining of a vinyl composition coating applied to a bitumen impregnated felt can be obtained only in the case of tricresyl phosphate, and provided further that the tricresyl phosphate is used as the sole plasticizer in a composition consisting essentially of tricresyl phosphate in combination with vinyl chloride polymer resin as the sole ingredients and that the felt contains a relatively low amount of bituminous impregnating material which does not exceed a critical maximum amount. I also have found that the foregoing respecting the provision of a seal coat provides good adhesion both with the bitumen impregnated felt and with the overlying coating or layer of vinyl composition, and that the so formulated seal coat has the further advantage of affording continuity of film structure and effective barrier protection even when employed in very thin films, the tricresyl phosphate having special properties in this regard.

In the seal coat of this invention the tricresyl phosphate appears to be unique in that it becomes distributed with the vinyl chloride polymer resin as a continuous structure having such permanency that it does not come to the surface or migrate either into the base sheet or into an overlying coating of vinyl composition which is used for ornamentation or wear resistance or both and in that it likewise has the quality of such high resistance to the action of bituminous impregnating materials that even when the seal coat is disposed in a very thin film the tendency of the bituminous impregnating material contained in the felt base sheet to migrate is effectively blocked. Asphalt and other bituminous materials have a very strong tendency to migrate, particularly when warm. One of the difficulties previously experienced in connection with attempts to use vinyl compounds in a seal coat has been that when the vinyl compound is heated to fusing temperature on the surface of the bitumen impregnated base sheet, the softened bitumen bleeds into the fused vinyl resin, thus becoming available for staining a subsequently applied coating of vinyl composition. Of course, more gradual migration and eventual staining also is objectionable; in fact any staining at all, even if slight, means a defective and commercially valueless product. It is seen, therefore, that tricresyl phosphate has unique properties, for both during fusion and over the years it not only maintains its entity as a coherent barrier film but also at all times provides such an effective barrier that the bitumen from the base sheet does not penetrate through to the coating, either during the process of manufacture or in subsequent use. Regardless of its thickness, so long as the seal coat of this invention is continuous there is no staining at all of an overlying coating or layer of vinyl composition. In addition to the foregoing, it is also the case that the tricresyl phosphate does not impair the capacity of the vinyl chloride polymer resin to adhere to an overlying coating or layer of vinyl composition and the mixture of these substances likewise strongly and permanently adheres to the bituminized felt to which it is applied.

The vinyl chloride polymer resin may be polyvinyl chloride such as the delta and gamma polyvinyl chlorides, although the somewhat more soluble beta polyvinyl chloride likewise may be utilized. Polyvinyl chloride copolymers also are suitable such as a copolymer of vinyl chloride and vinyl acetate which contains about 90% to about 97% of vinyl chloride, the average molecular weights being above 16,000 as determined by Staudinger's method, and similar copolymers of vinyl chloride with substances such as dibutyl maleate, ethyl acrylate, methylacrylate, butyl acrylate, methyl methacrylate and butyl methacrylate. Copolymers of vinyl chloride and acrylonitrile containing about 45% to 80% vinyl chloride and copolymers of vinyl chloride and vinylidene chloride may also be used. Such resins are relatively insoluble in toluene at 25° C., in that for a ratio of ten parts of toluene to one part of resin no more than 15% by weight of the entire resin will be extracted. These resins are referred to herein and in the claims by the term "vinyl chloride polymer resins."

The seal or barrier coating preferably contains approximately thirty parts by weight of tricresyl phosphate per 100 parts by weight of vinyl chloride polymer resin, although satisfactory performance in accordance with this invention is afforded within the range of about twenty to about fifty parts by weight of triscresyl phosphate per 100 parts of vinyl chloride polymer resin.

The seal coat preferably is applied as an organosol and the applied coating is dried and fused, the fusing being effected by subjecting the dried coating to a fusing temperature of the order of 350° F. However, any suitable way for obtaining a substantially uniform distribution of the vinyl chloride in the form of a dispersion which can be fused may be used. Thus it is possible to disperse the resin in the tricresyl phosphate and apply the resulting mixture without employing a volatile vehicle, particularly if a viscosity depressant for the vinyl chloride polymer resin is employed. Dispersion of the vinyl chloride polymer resin is facilitated if a volatile solvent of the aromatic type is employed such as toluol and xylol or of the ketone type is employed such as methyl ethyl ketone, ethyl butyl ketone and diisobutyl ketone. Such solvents have a softening or swelling effect on the vinyl chloride polymer resin. Preferably, a substantial amount of a volatile organic liquid is employed as an extender for aiding in the application and distribution of the suspension. For this purpose, a petroleum hydrocarbon such as naphtha and textile spirits may be employed. For obtaining good results the volatile liquid vehicle, if employed, should not exceed about 40% by weight of the seal coat composition as it is applied and the total solvent of the aromatic or ketone type should not exceed about 20% by weight of the composition, not over about 8% by weight being preferable. Particularly if a viscosity depressant is used for the vinyl chloride polymer resin a volatile vehicle consisting solely of petroleum hydrocarbon may be employed. For most purposes the organic liquid vehicle contains from about 80% to about 100% by weight of vehicle of the petroleum hydrocarbon type and from zero to about 20% by weight of vehicle of the aromatic and/or ketone type. While the seal coat is preferably applied in the form of an organosol, it is also possible to apply the dispersion as a hydrosol instead of an organosol.

The liquid seal coat composition may be applied to the felt base sheet in any desired way, application by the reverse roll coater method being preferred. However, other coating methods familiar to those versed in the art may be employed such as flexible or rigid doctors or a conventional roll coater. After the coating has been applied any volatile component is removed so as to dry the coating, and the coating is subjected, as by exposure to infra red radiation, to a temperature at which the vinyl chloride polymer resin particles comprised in the suspension become fused to produce the seal coat in the form of a continuous film. The fusing temperature suitable for most vinyl chloride polymer resins is of the order of 350° F., although somewhat higher or lower temperatures may be employed depending upon whether the vinyl chloride polymer resin has a relatively low or a relatively high softening point.

As stated above, the seal coat consists essentially of the fused polyvinyl chloride resin and the tricresyl phosphate; no other plasticizer for the polyvinyl chloride resin being present. The seal coat likewise should be substantially free of materials such as fillers, pigments and the like. However, a stabilizer may be present in small amount such as an organic compound of lead, tin, barium and cadmium. For assisting in initial application of the coating a small amount of a viscosity depressant or other modifier may, if desired, be utilized in the seal coat.

For the base sheet any suitable felt may be employed. The felt generally is produced by felting fibers using a Fourdrinier or cylinder paper machine so that the thickness of the resulting felt is that usual for use in floor and wall coverings, i. e., about .02 to about .08 inch, a thickness of about .055 inch usually being preferable for most purposes. The usual fibers used in felts for floor and wall coverings may be employed such as wood fibers, rag fibers and the like, although other fibers may be used including fibers of mineral and animal origin.

As regards impregnation of the felt with a bituminous material, it is the amount of the bituminous impregnating material that is of principal concern rather than the type of bitumen that is employed. Because the amount of bitumen that may be used varies with different compositions, i. e., depending on the "furnish" of the felt, the limit of impregnation of the felt is more accurately expressed in terms of percentage of the "kerosene value" of the felt, the "kerosene value" of the felt, as this term is used herein and in the claims, being the maximum amount of kerosene that can be absorbed by a bone dry sample of a particular felt according to the test as prescribed in Underwriter's Laboratories, Inc., standard for Class "C" Asphalt Rag-Felt Sheet Roofing and Shingles specification, Ninth Edition, November 1946. The maximum amount of bitumen used to impregnate the felt should not be above about 85% of the kerosene value, and usually according to preferred practice, the amount of bitumen employed is of the order of 65% plus or minus 5 of the kerosene value. Such amounts of bitumen run low in comparison with the amounts used in felts for floor and wall coverings, which latter amounts usually correspond with or are more than the kerosene value of the felt. By thus holding down the quantity of bitumen a thin, continuous, effective seal coat may be made firmly adherent to the felt under the conditions of application and fusion that are employed in producing the seal coat.

Any bituminous material that is conventional for impregnating felt used for floor and wall coverings may be employed in the practice of this invention. Usually asphalts are used of either petroleum or natural origin or blend of both; and they may be crude, blown or steam distilled. In addition, other bitumens may be used such as tar or pitch residues of vegetable and animal origin. Generally the bitumen most suitable for impregnating the felt base sheet will have a melting point of about 140° F. to about 150° F.; a penetration of about 8 to about 12 at 32° F.; a penetration of about 22 to about 27 at 77° F.; a penetration of about 95 to about 100 at 115° F.; and a ductility of not less than 20 at 77° F. when heated according to ASTM methods E28–51T, D5–49, and D113–44. As affording a typical example of the practice of this invention, an asphalt having such characteristics may be used to impregnate a felt sheet about .055 inch in thickness consisting of 40% rag fiber, 40% wood fiber, 17% paper stock and 3% wood flour so that the amount of asphalt is about 60% of the kerosene value of the felt.

An organosol that exemplifies typical preferred practice of this invention has the following composition in parts by weight:

| | Parts |
|---|---|
| Polyvinyl chloride | 100 |
| Tricresyl phosphate | 30 |
| Naphtha | 13 |
| Diisobutyl ketone | 1.4 |

An organosol such as that above exemplified is applied directly to the surface of the felt and typically may be applied at the rate of about 0.25 pound dry weight per square yard. After application the coating is dried and the dried dispersion of vinyl chloride polymer resin is fused by bringing it to a temperature of about 350° F. so as to provide a continuous barrier film. If the felt is relatively smooth a continuous and effective seal coat can be afforded even when the thickness of the seal coat is reduced to as little as about 0.15 pound dry weight per square yard. There is no upper limitation as regards the thickness of the seal coat other than that incident to considerations of economy.

The accompanying drawing is a sectional view of a floor covering which further exemplifies this invention wherein 1 designates an impregnated felt base sheet as described and exemplified hereinabove, 2 is the seal coat as described and exemplified hereinabove which has been applied directly to the felt base sheet, and 3 is a decorative and wear-resistant top layer of vinyl composition which has been directly applied to the seal coat. The term "layer" is used herein and in the claims as covering coatings and preformed films or thin sheets applied to the seal coat for the base sheet and a preformed film of vinyl composition is to be considered directly adherent to the seal coat when bonded thereto by a vinyl adhesive.

The impregnated felt base sheet having the seal coat applied thereto as hereinabove described may have any type of vinyl composition applied thereto in any appropriate form depending on such factors as the decorative effect desired and the wear resistance desired. Thus vinyl compositions comprising a vinyl resin, a plasticizer and some suitable pigment, filler or the like may be applied as an organosol, a plastisol, or a hydrosol followed by drying and fusion. Alternatively, a vinyl composition may be applied of the type wherein the plasticized vinyl resin is dissolved in a suitable solvent vehicle. Particularly if a heavier coating layer is desired a preformed film of vinyl composition may be applied using a suitably vinyl adhesive for uniting it with the seal coating. If desired, a pigmented vinyl printing ink may be initially applied to the seal coat followed by the application of a clear vinyl coating composition. In such compositions the binder component may include substances other than vinyl resin and plasticizer therefor, but in any case the vinyl resin and plasticizer constitute a major proportion of the binder component and thereby characterize the composition as a vinyl composition, as this term is used herein and in the claims. Of course, the vinyl composition coating may be applied so as to provide either a uniform color effect or a variegated or pattern effect as may be desired. In such vinyl composition coatings the vinyl resin need not necessarily be of the vinyl chloride polymer type and any vinyl resin may be used which, either alone or in combination with a plasticizer, provides the desired toughness and hardness for the covering at ordinary temperatures.

As stated hereinabove, when a vinyl composition is applied in the form of one or more coatings or layers to the felt base sheet comprising the seal coat in accordance with this invention, the resulting covering is one in which there is excellent adhesion between the layers and which is free of any bleeding or staining from the bitumen contained in the base sheet. If desired, the product may be subjected to embossing without impairing these characteristics of the product.

I claim:

1. A flexible hard-surface covering which comprises a felt base sheet impregnated with bitumen constituting not more than about 85% of the kerosene value of the felt, a seal coat which is directly adherent to and formed on said impregnated felt and which consists essentially solely of tricresyl phosphate anl vinyl chloride polymer resin in the proportion of about twenty to about fifty parts by weight of said tricresyl phosphate to 100 parts by weight of said vinyl chloride polymer resin, and a layer of vinyl resin composition directly adherent to and formed on said seal coat.

2. A flexible hard-surface covering which comprises a felt base sheet impregnated with asphalt having a softening point of about 140° F. to about 154° F. constituting from about 60% to about 70% of the kerosene value of the felt, a continuously fused seal coat which is directly adherent to and formed on said impregnated felt and which consists essentially solely of tricresyl phosphate and vinyl chloride polymer resin in the proportion of about twenty to about fifty parts by weight of said tricresyl phosphate to 100 parts by weight of said vinyl chloride polymer resin, and a layer of vinyl resin composition directly adherent to and formed on said seal coat.

3. A flexible hard-surface covering according to claim 2 wherein the proportion in parts by weight of said tricresyl phosphate to said vinyl chloride polymer resin is in the neighborhood of about 30 to 100.

References Cited in the file of this patent

UNITED STATES PATENTS

| | | |
|---|---|---|
| 1,929,453 | Semon | Oct. 10, 1933 |
| 2,054,869 | Smolak | Sept. 22, 1936 |
| 2,184,971 | Allen | Dec. 26, 1939 |
| 2,227,212 | Beck | Dec. 31, 1940 |
| 2,272,144 | Allen | Feb. 3, 1942 |
| 2,300,193 | Allen | Oct. 27, 1942 |
| 2,439,051 | McGill | Apr. 6, 1948 |
| 2,529,799 | Crockett | Nov. 14, 1950 |
| 2,624,682 | Hazeltine | Jan. 6, 1953 |
| 2,624,683 | Bezman | Jan. 6, 1953 |
| 2,705,684 | Hazeltine | Apr. 5, 1955 |